US008857760B2

(12) United States Patent
Brown et al.

(10) Patent No.: US 8,857,760 B2
(45) Date of Patent: Oct. 14, 2014

(54) PROPULSIVE UNIT FOR AN AIRCRAFT

(71) Applicant: Rolls-Royce PLC, London (GB)

(72) Inventors: Stephen Geoffrey Brown, Derby (GB); Lorenzo Raffaelli, Derby (GB)

(73) Assignee: Rolls-Royce PLC, London (GB)

( * ) Notice: Subject to any disclaimer, the term of this patent is extended or adjusted under 35 U.S.C. 154(b) by 96 days.

(21) Appl. No.: 13/644,980

(22) Filed: Oct. 4, 2012

(65) Prior Publication Data

US 2013/0087661 A1    Apr. 11, 2013

(30) Foreign Application Priority Data

Oct. 5, 2011   (GB) .................................. 1117079.2

(51) Int. Cl.
B64D 33/02    (2006.01)
B64D 29/00    (2006.01)
B64D 29/06    (2006.01)
B64D 29/02    (2006.01)
B64C 11/00    (2006.01)

(52) U.S. Cl.
CPC .............. B64C 11/001 (2013.01); B64D 29/02 (2013.01); B64D 33/02 (2013.01)
USPC ...................................................... 244/53 B

(58) Field of Classification Search
USPC .............. 244/201, 53 B, 54, 58; 60/796, 797; 248/554, 557; 137/15.1, 15.2
See application file for complete search history.

(56) References Cited

U.S. PATENT DOCUMENTS

| 3,242,671 | A |   | 3/1966  | Moorehead |       |
|-----------|---|---|---------|-----------|-------|
| 3,524,611 | A | * | 8/1970  | Frank     | 244/53 B |
| 4,456,203 | A | * | 6/1984  | Louthan   | 244/23 D |
| 4,477,039 | A | * | 10/1984 | Boulton et al. | 244/53 B |
| 4,782,659 | A | * | 11/1988 | Lewis et al. | 60/226.1 |
| 2010/0252689 | A1 | * | 10/2010 | Vauchel et al. | 244/53 B |

FOREIGN PATENT DOCUMENTS

| EP | 1 972 774 A2 | 9/2008 |
| GB | 2 162 582 A | 2/1986 |
| GB | 2 192 941 A | 1/1988 |
| GB | 2 242 402 A | 10/1991 |
| WO | WO 2010/061071 A2 | 6/2010 |

OTHER PUBLICATIONS

Jan. 16, 2012 British Search Report issued in British Patent Application No. GB1117079.2.

* cited by examiner

*Primary Examiner* — Philip J Bonzell
(74) *Attorney, Agent, or Firm* — Oliff PLC

(57) ABSTRACT

This invention relates to a propulsive unit for an aircraft, comprising: a nacelle which defines a duct for channeling an airflow when in use and which provides an outwardly facing surface of the propulsive unit, the outwardly facing surface having an aerodynamic shape; a fan unit for accelerating the airflow within the duct when in use; wherein the duct has an inlet and an outlet and the nacelle is operable to adjust the either or both of the area of the inlet and outlet while substantially retaining the aerodynamic shape of the outwardly facing surface.

15 Claims, 3 Drawing Sheets

PROPULSIVE UNIT FOR AN AIRCRAFT

TECHNICAL FIELD OF INVENTION

This invention relates to a propulsive unit for an aircraft. In particular, the invention relates to a propulsive unit for a distributed propulsion system for an aircraft.

BACKGROUND OF INVENTION

Conventional state of the art propulsion systems for large civil aircraft typically include one or more gas turbine engines placed under the wings of the aircraft. However, some studies have indicated that so-called distributed propulsion, which involves having numerous smaller propulsion units preferentially arranged around an aircraft, may provide some significant benefits in terms of noise reduction and fuel efficiency when compared with the current state of the art propulsive arrangements.

One known option for distributed propulsion is to provide numerous propulsive units which are located so as to capture and accelerate slow speed boundary layer air which has formed against the surface of the aircraft. This can lead to a significant reduction in overall fuel burn with the maximum benefit of boundary layer ingestion being achieved when the low speed flow is not mixed with the freestream flow, but is accelerated to homogeneous conditions by the propulsion system.

When implementing boundary layer ingestion, the inlet of the fan intake duct is located flush to a surface of the aircraft so that the low speed boundary layer that has developed can be captured and energized by the propulsion system. Typically, the inlet will be located where the boundary layer air is at its thickest such as towards the trailing edge of the wings or towards the tail end of the fuselage.

Current designs for distributed propulsion and airframe boundary layer ingestion propulsion units have fixed area intakes and outlets. This leads to different performance conditions from the engine which is governed by the specific geometry used and the conditions under which the propulsion unit is being used. It is likely that the geometry would be chosen to maximise fuel efficiency over a flight cycle and would therefore be designed to perform optimally during cruise conditions which dictate the mass flow ingested by the propulsion unit and the speed of the airflow. However, the optimum geometry for cruise may not be well suited to take off, which requires high mass flow ingestion from a low airflow speed, and descent idle, which requires very low airflow ingestions without disrupting the airflow over the wings.

WO2010061071 describes a gas turbine engine which includes an air intake duct which is designed to be aerodynamically continuous with the wing of an aircraft. However, this structure is largely fixed which suffers the lack of variability and the associated problems as described above. In an attempt to overcome this short fall, WO'071 describes the use of a movable flap to adjust the intake area. However, this solution disrupts the airflow over the wing and on the outer surface of the nacelle which can lead to a reduction in performance, rather than an increase as desired due to the movable structure introducing high drag airflows and the like.

The present invention seeks to provide an improved propulsive unit for an aircraft.

STATEMENTS OF INVENTION

In a first aspect, the present invention provides a propulsive unit for an aircraft, comprising: a nacelle which defines a duct for channeling an airflow when in use and which provides an outwardly facing surface of the propulsive unit, the outwardly facing surface having an aerodynamic shape; a fan unit for accelerating the airflow within the duct when in use; wherein the duct has an inlet and an outlet and the nacelle is operable to adjust either or both of the area of the inlet and outlet whilst substantially retaining the aerodynamic shape of the outwardly facing surface.

Having a nacelle which is operable to adjust either or both of the inlet and outlet of the duct whilst retaining the aerodynamic shape of the nacelles outwardly facing surface allows for a more efficient duct arrangement which can accommodate a greater variety of flying conditions without increasing the losses of the nacelle.

The aerodynamic shape may be thought of as a functional shape in some aspects, rather than a physical one. The aerodynamic shape may, for example, relate to a function of drag when in use. The aerodynamic shape may relate to the profile of the outwardly facing surface. The profile of the outwardly facing surface may be relative to the airflow in use. For example, the aerodynamic shape may be retained if the outwardly facing surface is maintained parallel to the airflow passing over it, when in use. Hence, extending or reducing the length of the nacelle, translating the position of the outwardly facing surface relative to the fan unit or aircraft body, and translating the nacelle in an upstream or downstream direction relative to the fan unit may be considered as retaining the aerodynamic shape. The outwardly facing surface may be rigid. The outwardly facing surface may be substantially continuous.

The propulsive unit may include a plurality of fan units. The fan units may be arranged so as to receive air from the inlet. The fan units may be arranged linearly across the width of the inlet.

The nacelle may be operable so as to be translated in a direction which is substantially upstream and downstream relative to the duct. The nacelle may be operable so as to be translated in a substantially perpendicular direction to the longitudinal axis of the duct.

The inlet may be rectangular. The outlet may be rectangular.

The nacelle may include one or more sliding sections which can extend or reduce the length of the nacelle so as to alter the geometry of either or both the inlet and outlet.

The nacelle may include a moveable portion on the trailing edge thereof which is operable to adjust the area of the outlet.

The nacelle may include an inner surface which has an anchor portion which is fixed relative to the fan unit and in which the outwardly facing surface can be translated relative to the anchor portion).

The nacelle may include at least one flexible portion which is deflected when the outwardly facing surface and anchor portion are translated relative to one another.

The flexible portion may provide on the inwardly facing surface of the nacelle so as to provide the duct with a continuous gas washed surface when the anchor portion and outwardly facing surface are relatively displaced in use.

In a second aspect, the present invention provides an aircraft comprising the propulsion unit of the first aspect.

The duct of the propulsion unit may at least partially defined by a surface of a wing structure.

The outwardly facing surface of the nacelle may form part of the gas washed surface of the wing structure.

The wing structure may include a movable portion which is operable to adjust the area of the outlet. The movable portion may be provided on a trailing edge of the wing.

The movable portion may be translatable to adjust the aerodynamic profile of the wing.

DESCRIPTION OF DRAWINGS

Embodiments of the invention defined by the claims will now be described with the aid of the following drawings in which:

DETAILED DESCRIPTION OF INVENTION

Figure 1A:
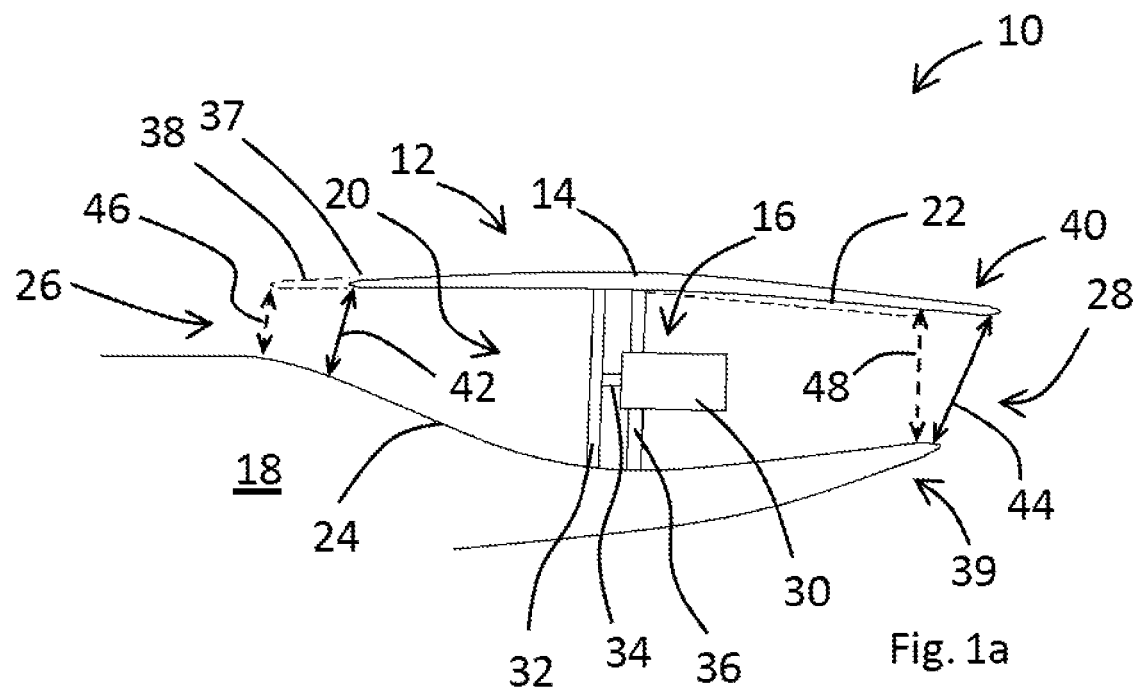
FIGS. 1a and 1b respectively show a schematic cross section and perspective view of a propulsive unit according to the present invention
Figure 1B:
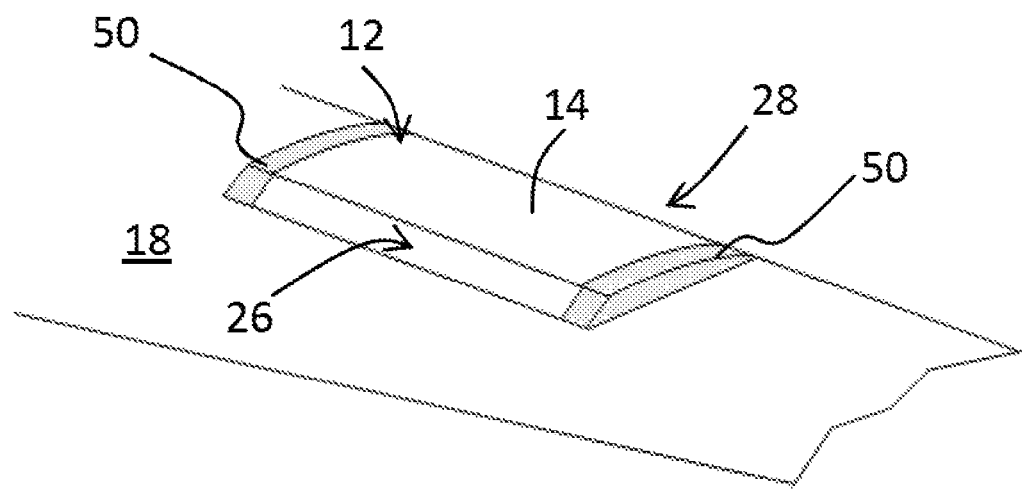

FIGS. 1a and 1b there is shown a propulsive unit 10 according to the present invention. The propulsive unit 10 includes a duct 20 having a nacelle 12 with an outwardly facing surface 14, and a fan unit 16. The propulsion unit 10 is mounted on a wing structure 18 of an aircraft such that an inwardly facing surface 22 of the nacelle and an upper surface 24 of the wing defines the duct 20.

The outwardly facing surface 14 in the described embodiment has an aerodynamic shape which is in the form of a gas washed surface of the wing. Thus, in use, the outwardly facing surface 14 helps generate lift. It will be appreciated that the outwardly facing surface may be located elsewhere on the aircraft and as such the aerodynamic shape may fulfill other purposes such as helping reduce drag.

The fan unit 16 is mounted within the duct 20 and includes a drive unit 30, for example an electric motor, which is supported by struts 36 which can also have an aerodynamic functionality to improve fan efficiency, for example, the struts may take the form of an Outlet Guide Vane which are commonly known in the art. The drive unit 30 is coupled to and drives some rotatable fan blades 32 via a shaft 34. As will be appreciated, the portion of the duct 20 which houses the fan unit 16, in particular, the fan blades 32, will be sized and shaped to minimise upstream leakage airflow over the tips of the fan blades 32. As such the duct may include abradable liners as are currently known in the art. Further, the duct 20 may, in some embodiments, include features or panels which aid the acoustic performance of the propulsive unit. Further still, the duct 20 may be configured to accommodate a plurality of fan units 16 which all receive air from the inlet 26. The plurality of fans may be located in a linear arrangement in which they are placed side by side.

The duct 20 includes a rectangular inlet 26 and a rectangular outlet 28 at the upstream and downstream ends of the duct 20 respectively. Thus, the wall of the duct 20 is shaped such that cross-sectional profile of the duct 20 at the rectangular inlet 26 is morphed into the circular cross-section required at the fan unit 16, and back to a rectangular profile at the outlet 28.

The nacelle 12 is operable such that it can be translated relative to the wing 18 and in doing so vary the area of the inlet 26 and outlet 28. Specifically, in the embodiment shown in FIG. 1, the nacelle 12 can be translated in a direction which is substantially coaxial with the longitudinal axis of the duct 20 from a first position 37 (as indicated by the solid line) to a second position 38 (as indicated by the dashed line). In other words, the nacelle 12 can be translated in an upstream or downstream direction relative to the fan unit 16.

Translating the nacelle 12 in this way allows the position of the inlet 26 as defined by the nacelle 12 to be moved between the first 37 and second 38 positions. The outlet 28 is increased as the minimum separation between the trailing edge 39 of the wing 18 and the trailing edge of the nacelle 40 move axially apart. Thus, the inlet has a first inlet 42 and a first outlet dimension 44, and a second inlet 46 and a second outlet dimension 48, as determined by the position of the nacelle 12 relative to the wing 18.

Translation of the nacelle 12 is achieved using actuators 50 which are located in support structures along the transverse edges of the nacelle 12 as can be seen in FIG. 1b. Details of the actuators are provided with reference to FIG. 4 below.

Figure 2A:
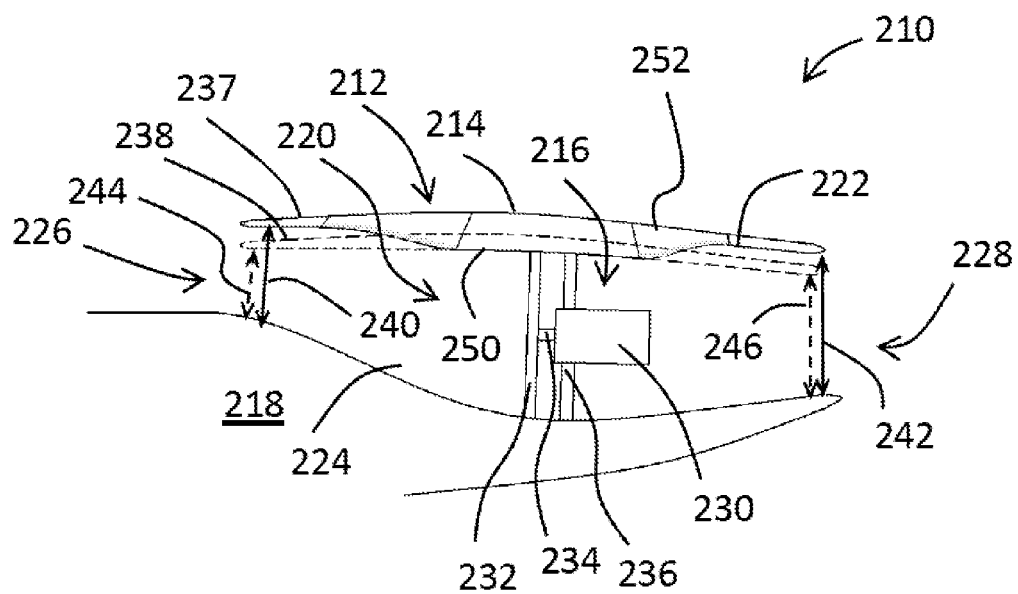
FIGS. 2a and 2b show schematic cross sections of an alternative propulsive unit.
Figure 2B:
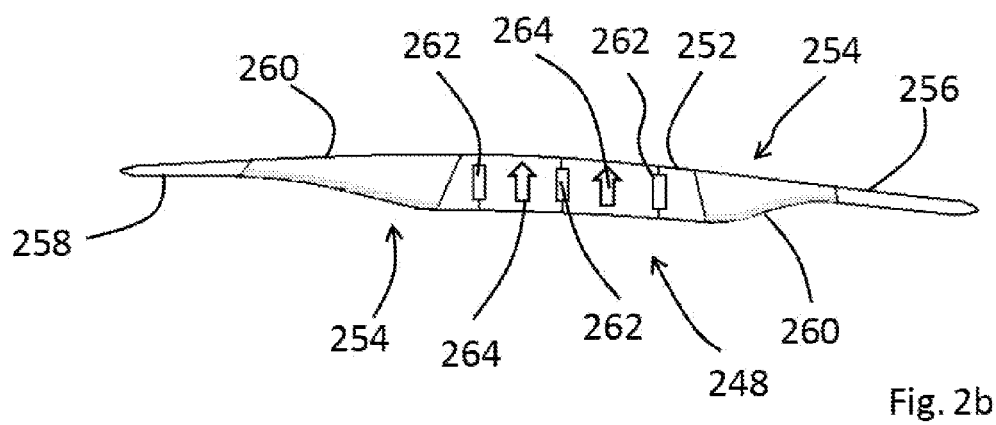

FIGS. 2a and 2b shows propulsive unit 210 similar to the one described in relation to FIGS. 1a and 1b. Thus there is shown a propulsive unit 210 according to the present invention which includes a duct 220 having a nacelle 212 with an outwardly facing surface 214, and a fan unit 216. The propulsion unit 210 is mounted on a wing structure 218 of an aircraft such that an inwardly facing surface 222 of the nacelle and an upper surface 224 of the wing defines the duct 220.

The outwardly facing surface 214 in the described embodiment has an aerodynamic shape which is in the form of a gas washed surface of the wing 218. Thus, in use, the outwardly facing surface 214 helps generate lift. It will be appreciated that the outwardly facing surface may be located elsewhere on the aircraft and as such the aerodynamic shape may be such that it helps reduce drag.

The fan unit 216 is mounted within the duct 220 and includes a drive unit 230, for example an electric motor, which is supported by struts 236 which can also have an aerodynamic functionality to improve fan efficiency, for example, the struts may take the form of an Outlet Guide Vane which are commonly known in the art. The drive unit 230 is coupled to and drives some rotatable fan blades 232 via a shaft 234. As will be appreciated, the portion of the duct 220 which houses the fan 216, in particular, the fan blades 232, will be sized and shaped to minimise upstream leakage airflow over the tips of the fan blades 232. As such the duct 220 may include abradable liners as are currently known in the art. Further, the duct 220 may include features or panels which aid the acoustic performance of the propulsive unit. Further still, the duct 220 may be configured to accommodate a plurality of fan units 16 which all receive air from the inlet 226. The plurality of fans may be located in a linear arrangement in which they are placed side by side.

The duct 220 includes a rectangular inlet 226 and a rectangular outlet 228 at the upstream and downstream ends of the duct 220 respectively. Thus, the wall of the duct 220 is shaped such that cross-sectional profile of the duct 220 at the rectangular inlet 226 is morphed into the circular cross-section required at the fan unit 216, and back to a rectangular profile at the outlet 228.

The propulsion unit shown in FIGS. 2a and 2b differs from the earlier described one in that the translation of the nacelle 212 is in a direction which is substantially perpendicular to the fluid path through the duct 220. In this way, the translation of the nacelle 212 increases the inlet 226 and outlet 228 areas by adjusting the depth of the duct 220. In order to achieve this the nacelle 212 comprises several different sections which allow it to be expanded from a first configuration 237 to a second configuration 238 in which the outwardly facing surface 214 is displaced away from the inner 222 thereby increasing the inlet 226 and outlet 228 areas.

Specifically, the nacelle 212 includes a mid-section 248, two flexible portions 254, one upstream and one downstream of the mid-section 248, and rigid leading 258 and trailing edge 256 sections.

The mid-section 248 defines the circular cross section in which the fan blades are located and includes an anchor plate 250 and an upper outwardly facing surface 252. The anchor 250 is attached to the struts 236 which support the fan unit 216 and also to the wing 218 at the peripheral edges which run substantially parallel to the longitudinal axis of the duct 220. The mid-section 248 includes a cavity between the anchor plate 250 and the upper outwardly facing surface 252. The mid-section 248 is attached to the leading 258 and trailing 256 edges of the nacelle 212 via the flexible portions 254 which provide a resiliently deformable joint 260 between the leading 258 and trailing 256 edges. The flexible portions 254 are arranged such that they retain the shape of the outwardly facing surface 252 but provide a continuous aerodynamic surface on the inner surface 222 of the nacelle 212 which defines the duct 220. The flexible portions can be made from any suitable material as known in the art. For example, the flexible portions may be made from a reinforced silicon rubber.

Within the cavity there is a plurality of actuators 262 which are operable to displace the upper surface 252 relative to the lower portion thereby increasing the gap between them as indicated by arrows 264. When operated, the actuators 262 extend the outwardly facing surface 252 away from the duct 220 such that the inlet 226 and outlet 228 increase. In doing so, a vertical separation is introduced between the anchor plate 250 and the leading 258 and trailing 256 edge portions. This vertical separation is accommodated by the flexible portions 254 which deflect so as to provide a gradually curving surface between the anchor plate 250 and inner surface 222 of the trailing 256 and leading 258 edges.

Figure 3:
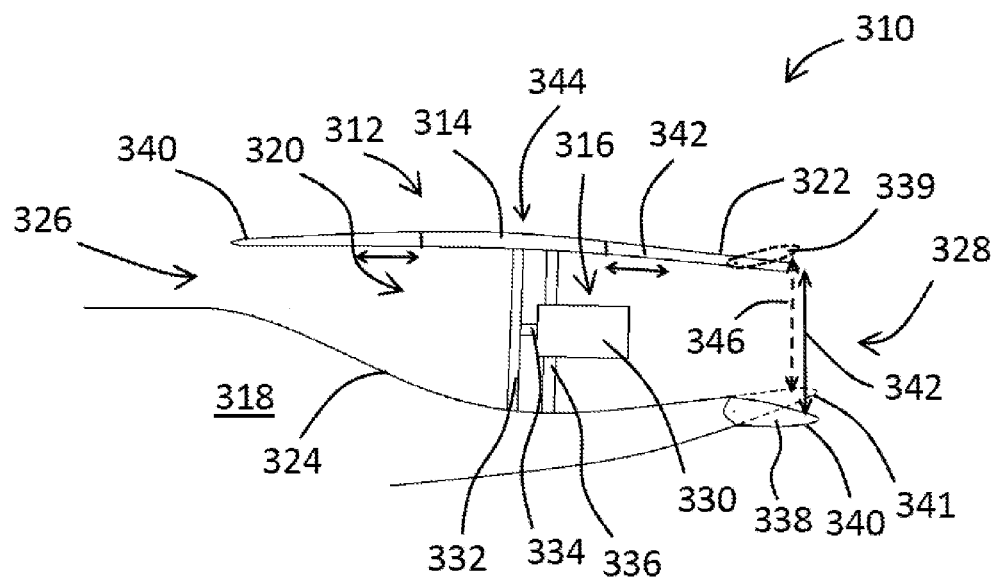
FIG. 3 shows a schematic cross section of an alternative embodiment of the invention.

FIG. 3 shows a yet further embodiment which includes a propulsive unit 310 according to the present invention. The propulsive unit 310 includes duct 320 having a nacelle 312 with an outwardly facing surface 314, and a fan unit 316. The propulsion unit 310 is mounted on a wing structure 318 of an aircraft such that an inwardly facing surface 322 of the nacelle and an upper surface 324 of the wing defines the duct 320.

The outwardly facing surface 314 in the described embodiment has an aerodynamic shape which is in the form of a gas washed surface of the wing. Thus, in use, the outwardly facing surface 314 helps generate lift. It will be appreciated that the outwardly facing surface may be located elsewhere on the aircraft and as such the aerodynamic shape may be such that it helps reduce drag.

The fan unit 316 is mounted within the duct 320 and includes a drive unit 330, for example an electric motor, which is supported by struts 336 which can also have an aerodynamic functionality to improve fan efficiency, for example, the struts may take the form of an Outlet Guide Vane which are commonly known in the art. The drive unit 330 is coupled to and drives some rotatable fan blades 332 via a shaft 334. As will be appreciated, the portion of the duct 320 which houses the fan 316, in particular, the fan blades 332, will be sized and shaped to minimise upstream leakage airflow over the tips of the fan blades 332. As such the duct may include abradable liners as are currently known in the art. Further, the duct may include features or panels which aid the acoustic performance of the propulsive unit.

The duct includes a rectangular inlet 326 and a rectangular outlet 328 at the upstream and downstream ends of the duct respectively. Thus, the wall of the duct is shaped such that cross-sectional profile of the duct at the rectangular inlet 326 is morphed into the circular cross-section required at the fan unit 316, and back to a rectangular profile at the outlet 328.

At the trailing edge of the wing and nacelle there are provided deflectable or movable portions in the form of flaps 338, 339 which are operable to control the aerodynamic shape of the wing 318 and the size of the outlet 328. In the case of the nacelle flap, 339, it will be appreciated that this forms a separate entity to the nacelle 312. The flaps 338, 339 are pivotably connected to the trailing edge of the wing structure and nacelle respectively and actuated in a similar fashion as is known for state of the art flaps on conventional aircraft wings. Operating the flap 338, 339 moves them from a first position 340 to a second position 341, thereby providing the outlet 328 with a first dimension 342 and a second dimension 344, respectively.

This embodiment is particularly advantageous as the actuation technology and its implementation is currently well known for conventional aircraft.

It will be appreciated that the flaps 338, 339 may be operated together or independently. Further, it may be preferential to include only one of the wing 338 or nacelle 339 flaps, not both, depending on the application and its aerodynamic requirements.

A further optional feature shown in FIG. 3 is sliding sections at the trailing 342 and leading 340 edges of the nacelle. The sliding sections 340, 342 are arranged to translate upstream or downstream of the mid-portion 344 in which the fan 316 is located, thereby providing a means for independently altering the inlet 326 and outlet 328 geometries whilst retaining the aerodynamic shape of the nacelle 312. Each of the sliding sections 340, 342 may be operated by actuators as described below in relation to FIG. 4. Hence, in this way, the nacelle 312 includes one or more sliding sections 340, 342 which can extend or reduce the length of the nacelle 312 so as to alter the geometry of either or both the inlet 326 and outlet 328.

It will be appreciated that the sliding sections 340, 342 and flaps 338, 339 may be used in conjunction o the same propulsive unit or may be separately including in some embodiments where a higher degree of flexibility is not required.

Figure 4:
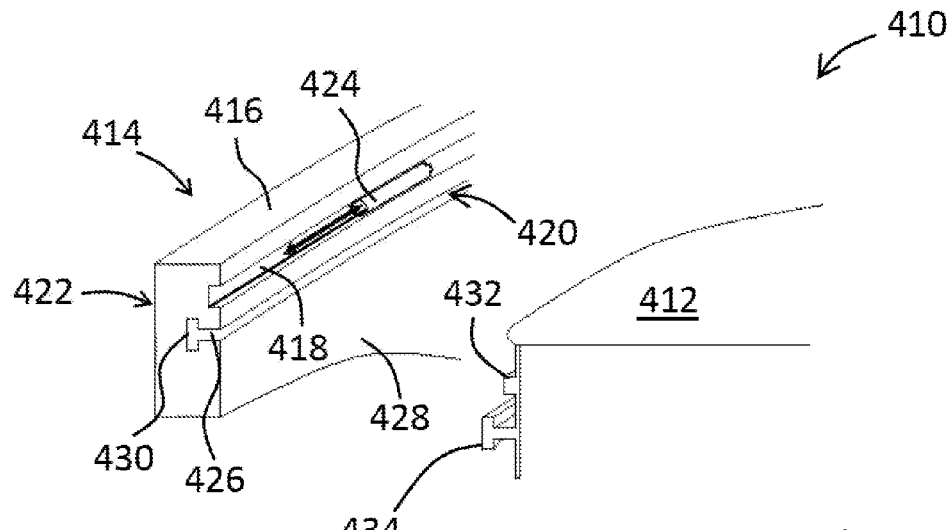
FIG. 4 shows an actuator system which may be used with the invention.

FIG. 4 shows an exploded and detailed view of the actuation system 410 shown in FIG. 2b (50). Hence, there is shown the nacelle 412 and a support member 414 which forms part of the wing 414. The support member 414 includes an actuation channel 418 and a support channel 420. The actuation channel 418 is in the form of a straight square groove which extends from an open end at the first, upstream, end 422 of the support member 414 in a direction which defines the translational upstream and downstream direction of the nacelle 412 as described above.

The actuation channel 418 includes an actuator 424 having a stator which is attached to the support member and an extendible mover which acts to move the nacelle 412 relative to the support member 414. The actuator 424 can be in the form of any known type suitable for the linear translation required for the operation of the nacelle described above. For example, the actuator 424 may any one or more taken from the non-exclusive group comprising: screw jacks, actuated either hydraulically, pneumatically or electrically; hydraulic pistons; and linear electrical actuators.

The support channel 420 is located radially inwards of and extends parallel to the actuation channel 418. It includes a first portion 426 which extends into the support member from the facing surface 428 of the support member 414 and intersects a second, perpendicular portion 430 at a mid-point thereby forming a T shape. The first, upstream end of the support channel 420 is opened ended as with the actuation channel.

The nacelle 412 includes a first projection 432 which extends from the upstream end of the nacelle 412 along a portion thereof. The first projection 432 is sized and shaped so as to be snugly received by the actuation channel 418 and includes a shoulder (not shown) which is configured to abut the mover of the actuator 424 in use. Thus, extending the mover of the actuator 424 results in a force being applied to the first projection 432 and the movement of the nacelle 412. It will be appreciated that movement in the opposite direction can be achieved using the same actuator 424 if the mover is attached to the second projection, or may require a further actuator.

The nacelle 412 also includes a second projection 436 which is sized and shaped to be snugly and slidably received by the support channel 420 in the support member 414, the T shape of the support channel 420 providing lateral retention and a bearing surface on which the nacelle can traverse longitudinally with respect to the channels and under the influence of the actuator 424.

It will be appreciated that one or more of the actuator system 410 shown in FIG. 4 can be incorporated into the propulsion system. For example, in one embodiment, there are separate actuators 410 to independently move the leading and trailing sliding sections of the nacelle as described in relation to FIG. 3, The skilled person will appreciate that other features may be incorporated into the above embodiments in accordance with standard practices in the art. For example, any of the embodiments above may include one or more control system to determine the position of the movable parts like the nacelle and to determine the optimum positions for a desired performance. For example, an aircraft incorporating the invention may have a processing unit to calculate the optimum inlet and outlet geometries for a particular part of a flight cycle and adjust any or all of: the nacelle, sliding sections and flaps.

It will be appreciated that the above described embodiments are examples of the broader inventive concept which is covered by the claims. For example, although the embodiments above describe a single fan unit within the duct, it is possible for there to be multiple fan units arranged in a transverse linear series, such that each inlet provides air for multiple fan units.

The invention claimed is:

1. A propulsive unit for an aircraft, comprising:
a nacelle which defines a duct for channeling an airflow when in use and which provides an outwardly facing surface of the propulsive unit, the outwardly facing surface having an aerodynamic shape; and
a fan unit for accelerating the airflow within the duct when in use;
the duct having an inlet and an outlet which are defined by the nacelle, and the nacelle being movable to adjust the position of the outwardly facing surface and the areas of the inlet and the outlet whilst substantially retaining the aerodynamic shape of the outwardly facing surface.

2. A propulsive unit for an aircraft as claimed in claim 1 wherein
the nacelle is operable so as to be translated in a direction which is substantially upstream and downstream relative to the duct.

3. A propulsive unit for an aircraft as claimed in claim 1 wherein
the nacelle is operable so as to be translated in a substantially perpendicular direction to a longitudinal axis of the duct.

4. A propulsive unit for an aircraft as claimed in claim 1 wherein
the inlet is rectangular.

5. A propulsive unit for an aircraft as claimed in claim 1 wherein
the outlet is rectangular.

6. A propulsive unit for an aircraft as claimed in claim 1 wherein
the nacelle includes one or more sliding sections which can extend or reduce the length of the nacelle so as to alter the geometry of either or both the inlet and outlet.

7. A propulsive unit for an aircraft as claimed in claim 1 wherein
the nacelle includes an inner surface which has an anchor portion which is fixed relative to the fan unit and in which the outwardly facing surface can be translated relative to the anchor portion.

8. A propulsive unit for an aircraft as claimed in claim 7 wherein
the nacelle includes at least one flexible portion which is deflected when the outwardly facing surface and anchor portion are translated relative to one another.

9. A propulsive unit for an aircraft as claimed in claim 8 wherein
the flexible portion is provided on the inwardly facing surface of the nacelle so as to provide the duct with a continuous gas washed surface when the anchor portion and outwardly facing surface are relatively displaced in use.

10. An aircraft comprising a propulsion unit as claimed in claim 1.

11. An aircraft as claimed in claim 10 wherein
the duct is at least partially defined by a surface of a wing structure.

12. An aircraft as claimed in claim 10 wherein
the outwardly facing surface forms part of the gas washed surface of the wing structure such that the outwardly facing surface generates lift.

13. An aircraft as claimed in claim 10 wherein
the wing structure includes a movable portion which is operable to adjust the area of the outlet.

14. An aircraft as claimed in claim 13 wherein
the movable portion is provided on a trailing edge of the wing.

15. An aircraft as claimed in claim 13 wherein
the movable portion is translatable to adjust the aerodynamic profile of the wing.

* * * * *